(12) United States Patent
Pillai et al.

(10) Patent No.: US 7,560,410 B2
(45) Date of Patent: Jul. 14, 2009

(54) GOLD-CERIA CATALYST FOR OXIDATION OF CARBON MONOXIDE

(75) Inventors: Unnikrishnan R. Pillai, Richmond, VA (US); Sarojini Deevi, Midlothian, VA (US)

(73) Assignee: Philip Morris USA Inc., Richmond, VA (US)

( * ) Notice: Subject to any disclaimer, the term of this patent is extended or adjusted under 35 U.S.C. 154(b) by 164 days.

(21) Appl. No.: 11/452,995

(22) Filed: Jun. 15, 2006

(65) Prior Publication Data

US 2007/0056601 A1   Mar. 15, 2007

Related U.S. Application Data

(63) Continuation of application No. 11/252,849, filed on Oct. 19, 2005, now abandoned.

(60) Provisional application No. 60/621,545, filed on Oct. 25, 2004.

(51) Int. Cl.
| | |
|---|---|
| *B01J 23/00* | (2006.01) |
| *B01J 23/10* | (2006.01) |
| *B01J 23/02* | (2006.01) |
| *B01J 23/06* | (2006.01) |
| *B01J 23/04* | (2006.01) |
| *C01B 31/18* | (2006.01) |
| *C10K 1/00* | (2006.01) |
| *A24B 1/00* | (2006.01) |
| *B01D 59/26* | (2006.01) |

(52) U.S. Cl. ............... 502/304; 502/343; 502/344; 423/247; 131/360; 96/108

(58) Field of Classification Search .......... 502/300, 502/302, 304, 344, 349, 303, 340, 341, 342, 502/343, 345, 346, 347, 348; 131/200–202, 131/330, 331, 334, 360; 423/246, 247; 96/108
See application file for complete search history.

(56) References Cited

U.S. PATENT DOCUMENTS

| | | | | |
|---|---|---|---|---|
| 4,252,687 | A | * | 2/1981 | Dale et al. ............. 502/74 |
| 4,256,609 | A | * | 3/1981 | Dale et al. ............. 502/74 |
| 4,317,460 | A | * | 3/1982 | Dale et al. ............. 131/334 |
| 4,426,319 | A | * | 1/1984 | Blanchard et al. ...... 502/241 |
| 4,450,245 | A | * | 5/1984 | Adair et al. ........... 502/211 |
| 4,940,686 | A | * | 7/1990 | Tooley et al. .......... 502/327 |

(Continued)

FOREIGN PATENT DOCUMENTS

FR    2 771 310 A1    5/1999

(Continued)

OTHER PUBLICATIONS

FR2771310 Derwent abstract. Marecot et al. Patent Published May 28, 1999.*

(Continued)

*Primary Examiner*—Steven Bos
*Assistant Examiner*—Anthony J Zimmer
(74) *Attorney, Agent, or Firm*—Buchanan Ingersoll & Rooney PC

(57) ABSTRACT

A catalyst comprising gold nanodots on cerium oxide, catalytically active for oxidation of carbon monoxide at room temperature. The catalyst is prepared by deposition-precipitation followed by aging or ultrasound treatment.

8 Claims, 7 Drawing Sheets

U.S. PATENT DOCUMENTS

| | | | | |
|---|---|---|---|---|
| 4,943,550 | A * | 7/1990 | Kolts et al. | 502/327 |
| 4,956,330 | A * | 9/1990 | Elliott et al. | 502/326 |
| 4,994,247 | A * | 2/1991 | Tooley et al. | 423/247 |
| 5,017,357 | A * | 5/1991 | Kolts et al. | 423/437.2 |
| 5,050,621 | A * | 9/1991 | Creighton et al. | 131/331 |
| 5,258,340 | A * | 11/1993 | Augustine et al. | 502/60 |
| 6,509,292 | B1 * | 1/2003 | Blankenship et al. | 502/330 |
| 6,769,437 | B2 | 8/2004 | Hajaligol et al. | |
| 6,782,892 | B2 | 8/2004 | Li et al. | |
| 6,857,431 | B2 | 2/2005 | Deevi et al. | |
| 6,936,568 | B2 * | 8/2005 | Blankenship et al. | 502/330 |
| 7,004,993 | B2 | 2/2006 | Pithawalla et al. | |
| 7,152,609 | B2 | 12/2006 | Li et al. | |
| 7,165,553 | B2 | 1/2007 | Luan et al. | |
| 7,168,431 | B2 | 1/2007 | Li et al. | |
| 7,228,862 | B2 | 6/2007 | Hajaligoi et al. | |
| 7,243,658 | B2 | 7/2007 | Deevi et al. | |
| 2003/0074193 | A1 * | 4/2003 | Van Der Vleuten et al. | 704/219 |

FOREIGN PATENT DOCUMENTS

| | | |
|---|---|---|
| WO | WO 2004/002247 A2 | 1/2004 |
| WO | WO 2005/089937 A1 | 9/2005 |

OTHER PUBLICATIONS

WO2004002247 (FR2841438) Derwent Abstract. Fajardie, F. Published Jan. 8, 2004 (WO2004002247), Jan. 2, 2004 (FR2841438).*

International Preliminary Report on Patentability dated May 10, 2007 for PCT/IB2005/003529.

International Search Report and Written Opinion dated Jun. 6, 2006 issued in corresponding PCT/IB2005/003529.

D. Andreeva, V. Idakiev, T. Tabakova, L. Ilieva, P. Falaras, A. Bourlinos and A. Travlos, "Low-Temperature Water-Gas Shift Reaction Over Au/CeO$_2$ Catalysts" Catalysis Today, (2002) 72, 51-57.

M. A. Bollinger and M. A. Vannice, "A Kinetic and DRIFTS Study of Low-Temperature Carbon Monoxide Oxidation Over AU-TiO$_2$ Catalysts", Applied Catalysts B: Environmental, (1996) 8, 417-443.

Choi and H. G. Stenger, "Kinetics, Simulation and Insights for CO Selective Oxidation in Fuel Cell Applications," J. Power Sources, (2004), 129, 246-254.

Corti, C.W. et al, "Commercial Aspects of Gold Catalysis," Applied Catalysis A: General 291 (2005) 253-261, Elsevier B.V.

C. K. Costello, J. H. Yang, H. Y. Law, Y. Wang. J.-N. Lin, L. D. Marks, M. C. Kung and H. H. Kung, "On the Potential Role of Hydroxyl Groups in CO Oxidation Over Au/Al$_2$O$_3$" Applied Catalysis A: General, (2003), 243, 15-24.

C. K. Costello, M. C. Kung, H.-S. Oh, Y. Wang and H. H. Kung, "Nature of the Active Site for Co Oxidation on Highly Active Au/γ-Al$_2$O$_3$" Applied Catalysis A: General, (2002) 232, 159-168.

Deng, W. et al., "Low-Content Gold-Ceria Catalysts for the Water-Gas Shift and Preferential CO Oxidation Reactions," Applied Catalysis A: General 291 (2005) 126-135.

Diebold, U. "Dispersed Au Atoms, Supported on TiO$_2$(110)," Surface Science 578 (2005) 1-3, Elsevier B.V.

Q. Fu, S. Kudriavtseva, H. Saltsburg and M. Flytzani-Stephanopoulos, "Gold-ceria Catalysta for Low-Temperature Water-Gas Shift Reaction," Chem. Eng. Journal, (2003), 93, 41-53.

Gasior, M. et al., "Oxidation of CO and C$_3$ Hydrocarbons on Gold Dispersed on Oxide Supports," Catalysis Today 91-92 (2004) 131-135, Elsevier B.V.

A. C. Gluhoi, M. A. P, Comparative studies of the N2O/H2, N2O/CO, H2/O2 and CO/O2 reactions on supported gold catalysts: effect of the addition of various oxides, Journal of Catalysis, 219 (2003) 197-205, Academic Press.

Goodman, D.W., "Catalysis by Supported Gold Nanoclusters," Dekker Encyclopedia of Nanoscience and Nanotechnology, (2004) 611-620 Marcel Dekker, Inc., NY.

Grzybowska-Swierkosz, B., "Nano-Au/oxide Support Catalysts in Oxidation Reactions: Provenance of Active Oxygen Species," Catalysis Today 112 (2006 3-7, Elsevier B.V.

Masatake Haruta, "Size- and Support-Dependency in the Catalysis of Gold," Catalysis Today, (1997) 36 153-166.

Hutchings, G.J., "Catalysis by Gold," Catalysis Today 100 (2005) 55-61, Elsevier B.V.

Y. Iizuka, H. Fujiki, N. Yamauchi, T. Chijiiwa, S. Arai, S. Tsubota, M. Haruta, "Adsorption of CO on Gold Supported on TiO$_2$," Catalysis Today (1997) 36 115-123.

S. Ivanova, C. Petit and V. Pitchon, "A new preparation method for the formation of gold nanoparticles on an oxide support", Applied Catalysis A: General 267 (2004) 191-201.

A. I. Kozlov, A. P. Kozlova, H. Liu and Y. Iwasawa, "A New Approach to Active Supported Au Catalysts," Applied Catalysis A: General, (1999), 182, 9-28.

W. Liu and M. F. Stephanopoulos, "Total Oxidation of Carbon Monoxide and Methane Over Transition Metal-Fluorite Oxide Composite Catalysts," Journal of Catalysis, (1995), 153, 304-316.

Neri, G., "Role of the Au Oxidation State in the CO Sensing Mechanism of Au/Iron Oxide-Based Gas Sensors," Sensors and Actuators B 93 (2003) 402-408, Elsevier Science B.V.

Nijhuis, T.A., et al., "Direct Epoxidation of Propane Using Gold Dispersed on TS-1 and Other Titanium-Containing Supports," Ind. Eng. Chem. Res. (1999) 38:884-891, American Chemical Society.

H. -S.Oh, J. H. Yang, C. K. Costello, Y. M. Wang, S. R. Bare, H. H. Kung and M. C. Kung, "Selective Catalytic Oxidation of CO: Effect of Chloride on Supported Au Catalysts," Journal of Catalysis, (2002), 210, 375-386.

M. Okumura, S. Tsubota and M, Haruta, "Preparation of supported gold catalysts by gas-phase grafting of gold acetylacetonate for low-temperature oxidation of CO and of H2," Journal of Molecular Catalysis A: Chemical 199 (2003) 73-84.

E. D. Park and J. S. Lee, "Effects of Pretreatment Conditions on CO Oxidation over Supported Au Catalysts," Journal of Catalysis, (1999) 186 1-11.

Koichi Sayo, Shigehito Deki and Shigehiko Hayashi, "Novel Method for Preparation of a Nanosized Gold Catalyst Supported on TiO2," Journal of Colloid and Interface Science, (1999) 212 597-599.

M. M. Schubert, S. Hackenberg, A. C. van Veen, M. Muhler, V. Plzak and R. J. Behm, "CO Oxidation over Supported Gold Catalysts-"Inert" and "Active" Supported Materials and Their Role for the Oxygen Supply during Reaction," Journal of Catalysis (2001) 197 113-122.

T. Tabakova, V. Idakiev, D. Andreeva and I. Mitov, "Influence of the microscopic properties of the support on the catalytic activity of Au/ZnO, Au/ZrO2, Au/Fe2O3, Au/Fe2O3-ZnO, Au/Fe2O3-ZrO2 catalysts for the WGS reaction," Applied Catalysis A: General, 202 (2000) 91-97.

T. Tabakova, F. Boccuzzi, M. Manzoli. J. W. Sobczak, V. Idakiev and D. Andreeva, "Effect of Synthesis Procedure on the Low-Temperature WGS Activity of Au/ceria Catalysts," Applied Catalysis B: Environ., (2004), 49, 73-81.

Y. Tai, J. Murakami, K. Tajiri, F. Ohashi, M. Daté and S. Tsubota, "Oxidation of carbon monoxide on Au nanoparticles in titania and titania-coated silica aerogels," Applied Catalysis A: General 268 (2004) 183-187.

T. Uematsu, L. Fan, T. Maruyama, N. Ichikuni and S. Shimazu, New application of spray reaction technique to the preparation of supported gold catalysts for environmental catalysis, Journal of Molecular Catalysis A: Chemical, 182-183 (2002) 209-214.

A. Wolf and F. Schüth, "A Systemic Study of the Synthesis Conditions for the Preparation of Highly Active Gold Catalysts," Applied Catalysis A: General, (2002), 226, 1-13.

P. Bera and M. S. Hegde, "Characterization and Catalytic Properties of Combustion Synthesized Au/CeO$_2$ Catalyst" Catal. Lett., (Apr. 2002), 79:1-4, 75-81, Plenum Publishing Corporation.

G. R. Bamwenda, S. Tsubota, T. Nakamura and M. Haruta, "The Influence of the Preparation Methods on the Catalytic Activity of Platinum and Gold Supported on TiO$_2$ for CO Oxidation" Catal. Lett., (1997), 44:83-87, J.C. Baltzer AG, Science Publishers.

F. Bocuzzi, A. Chiorino, S. Tsubota and M. Haruta, "FTIR Study of Carbon Monoxide Oxidation and Scrambling at Room Temperature Over Gold Supported on ZnO and TiO$_2$," J. Phys. Chem (1996), 100:3625-3631.

N. W. Cant and N. J. Ossipoff, "Cobalt Promotion of Au/TiO2 Catalysts for the Reaction of Carbon Monoxide with Oxygen and Nitrogen Oxides," *Catalysis Today*, 36 (1997) 125-133, Elsevier Science, B.V.

W. S. Epling, G. B. Hoflund, J. F. Weaver, S. Tsubota and M. Haruta, "Surface Characterization Study of Au/α-$Fe_2O_3$ and Au/$Co_3O_4$ Low-Temperature CO Oxidation Catalysts" *J. Phys. Chem.*, (1996) 100, 9929-9934.

Q. Fu, A. Weber and M. Flytzani-Stephanopoulos, "Nanostructured Au-$CeO_2$ Catalysts for Low-Temperature Water-Gas Shift" *Catal. Lett.*, (2001) 77:1-3, 87-95.

A.C. Gluhoi, M.A.P. Dekkers and B. E. Nieuwenhuys, "Comparative Studies of the $N_2O/H_2$, $N_2O/CO$, $H_2/O_2$ and $CO/O_2$" *Journal of Catalysis* (2003) 219:197-205, Academic Press.

M. Flytzani-Stephanopoulos, "Nanostructured Cerium Oxide 'Ecocatalysts'" *Mat. Res. Soc. Bull.*, (Nov. 2001) 26:11, 885-889.

G.I. Golodets, "Heterogeneous Catalytic Reactions Involving Molecular Oxygen", *Studies in Surface Science and Catalystis* 15, Elsevier, Amsterdam (1983) pp. 280-311.

J-D. Grunwaldt, C. Kiener, C. Wögerbauer and A. Baiker, "Preparation of Supported Gold Catalysts for Low-Temperature CO Oxidation via 'Size-Controlled' Gold Colloids" *Journel of Catalysis* (1999) 181:223-232, Academic Press.

J-D. Grunwaldt, et al. "Comparative Study of Au/$TiO_2$ and Au/$ZrO_2$ Catalysts for Low-Temperature CO Oxidation," *Journal of Catalysis* 186 (1999) 458-469, Academic Press.

M. Haruta, N. Yamada, T. Kobayashi and S. Iijima, "Gold Catalysts Prepared by co-Precipitation for Low-Temperature Oxidation of Hydrogen and of Carbon Monoxide", *Journal of Catalysis*, (1989) 115:301-309, Academic Press.

M. Haruta, S. Tsubota, T. Kobayashi, H. Kageyama, M. J. Genet and B. Delmon Low-Temperature Oxidation of CO over Gold Supported on $TiO_2$, α-$Fe_2O_3$, and $Co_3O_4$, *Journal of Catalysis*, (1993) 144:175-192, Academic Press, Inc.

M. Haruta, "Size- and Support-Dependency in the Catalysis of Gold" *Catal Today*. (1997), 36:153-156, Elsevier Science B.V.

H. H. Kung, M. C. Kung and C. K. Costello, "Supported Au Catalysts for Low Temperature CO Oxidation", *Journal of Catalysis* (2003) 216:425-432, Academic Press.

M. Koudialov, M. C. Guta and S. Deevi, "Au/$Fe_2O_3$ Nanocatalysts for CO Oxidation by a Depsition-Precipitation Technique" *Nanotechnology*, (2004), 15:987-990, IOP Publishing Ltd, UK.

A.I. Kozlov et al, "Supported Gold Catalysts Prepared from a Gold Phosphine Precursor and As-Precipitated Metal-Hydroxide Precursors: Effect of Preparation Conditions on the Catalytic Performance" *Journal of Catalysis* 196 (2000) 56-65.

S-J. Lee and A. Gavriilidis, "Supported Au Catalysts for Low-Temperature CO Oxidation Prepared by Impregnation", *Journal of catalysis* (2002), 206:305-313, Elsevier Science USA.

F. Moreau, G. C. Bond and A. O. Taylor, "The influence of Metal Loading and pH During Preparation on the Co oxidation Activity of Au/$TiO_2$ Catalysts" *Chem. Commun.*, (Jun. 9, 2004) 1642-1643, The Royal Society of Chemistry.

J. F. Moulder, W. F. Stickle, P. E. Sobol and K. D. Bomben, Handbook of X-ray Photoelectron Spectroscopy, Eden Prairie: Perkin Elmer Corporation Physical Electronics Division, 1992.

Botao Qiao and Y. Deng, "Highly Effective Ferric Hydroxide Supported Gold Catalyst for Selective oxidation on CO in the Presence of $H_2$," *Chem. Commun.*, (2003) 2192-2193, The Royal Society of Chemistry.

A. Sanchez, S. Abbet, U. Heiz, W.-D. Schneider, H. Häkkinen, R. N. Barnett and U. Landman, "When Gold is Not Noble: Nanoscale Gold Catalysts" *J. Phys. Chem. A*, (Nov. 9, 1999), 103:9573-9578, American Chemical Society.

S. K. Tanielyan and R. L. Augustine, "Effect of Catalyst Pretreatment on the Oxidation of Carbon Monoxide over Coprecipitated Bold Catalysts" *Applied Catalysis A: General*, (1992) 85:73-87, Elsevier Science Publishers B.V., Amsterdam.

S. H. Taylor, G. J. Hutchings and A. A. Mirzaei, "Cooper Zinc Oxide Catalysts for Ambient Temperature Carbon Monoxide Oxidation" *Chem. Commun.*, (1999) 1373-1374.

D. Wang, Z. Hao, D. Cheng, X. Shi and C. Hu, "Influence of Pretreatment Conditions on Low-Temperature CO Oxidation over Au/MOx/$Al_2O_3$ Catalysts" *Journal of Molecular Catalysis A: Chemical* 200 (2003) 229-238, Elsevier Science B.V.

D. M. Whittle, A. A. Mirzaei, J. S. J. Hargreaves, R. W. Joyner, C. J. "Co-Precipitated Cooper Zinc Oxide Catalysts for Ambient Temperature Carbon Monoxide Oxidation: Effect of Precipitate Ageing on Catalyst Activity", *Phys. Chem. Chem. Phys.* (2002) 4:5915-5920, The Owner Societies.

W. Yan, B. Chen. S. M. Mahurin, S. Dai and S. H. Overbury, "Brookite-Supported Highly Stable Gold Catalytic System for CO Oxidation" *Chem. Commun.*, (Jul. 8, 2004) 1918-1919, The Royal Society of Chemistry.

U.S. Appl. No. 10/460,617, Preparation of Intermetallics by Metallo-Organic Decomposition, filed Jun. 13, 2003.

U.S. Appl. No. 10/460,631, Catalyst to Reduce Carbon Monoxide in the Mainstream Smoke of a Cigarette, filed Jun. 13, 2003.

U.S. Appl. No. 10/460,302, Oxidant/Catalyst Nanoparticles to Reduce Tobacco Smoke Constituents Such As Carbon Monoxide, filed Jun. 13, 2003.

U.S. Appl. No. 10/972,209, In Situ Sythesis of Composite Nanoscale Particles, filed Oct. 25, 2004.

U.S. Appl. No. 10/972,201, Tobacco Cut Filler Including Metal Oxide Supported Particles, filed Oct. 25, 2004.

U.S. Appl. No. 10/972,202, Preparation of Mixed Metal Oxide Catalysts From Nanoscale Particles, filed Oct. 25, 2004.

U.S. Appl. No. 10/972,203, Cigarettes and Cigarette Components Containing Nanostructured Fibril Materials, filed Oct. 25, 2004.

U.S. Appl. No. 10/866,181, Cigarette Wrapper With Catalytic Filler and Methods of Making Same, filed Jun. 14, 2004.

U.S. Appl. No. 10/870,449, Shredded Paper With Catalytic Filler in Tobacco Cut Filler and Method of Making Same, filed Jun. 14, 2004.

U.S. Appl. No. 10/972,206, Reduction of Carbon Monoxide in Smoking Articles Using Transition Metal Oxide Clusters, filed Oct. 25, 2004.

U.S. Appl. No. 10/868,015, Silver and Silver Oxide Catalysts for the Oxidation of Carbon Monoxide in Cigarette Smoke, filed Jun. 16, 2004.

U.S. Appl. No. 10/972,208, Reduction of Carbon Monoxide and Nitric Oxide in Smoking Articles Using Nanoscale Particles and/or Clusters of Nitrided Transition Metal Oxides, filed Oct. 25, 2004.

U.S. Appl. No. 11/252,773, Palladium-Containing Nanoscale Catalysts, filed Oct. 19, 2005.

U.S. Appl. No. 10/972,207, Use of Oxyhydroxide Compounds in Cigarette Paper For Reducing Carbon, filed Oct. 25, 2004.

U.S. Appl. No. 10/972,295, Cigarette Wrapper With Nanoparticle Spinel Ferrite Catalyst and Methods of Making Same, filed Oct. 25, 2004.

U.S. Appl. No. 10/972,204, In Situ Synthesis of Composite Nanoscale Particles, filed Oct. 25, 2004.

U.S. Appl. No. 11/653,856, Cigarette Components Having Encapsulated Catalyst Particles and Methods of Making and Use Thereof, filed Jan. 17, 2007.

U.S. Appl. No. 11/636,589, Supported Catalysts, filed Dec. 11, 2006.

U.S. Appl. No. 11/729,951, In Situ Formation of Catalytic Cigarette Paper, filed Mar. 30, 2007.

U.S. Appl. No. 11/698,192, Catalysts to Reduce Carbon Monoxide Such as in the Mainstream Smoke of a Cigarette, filed Jan. 26, 2007.

U.S. Appl. No. 10/950,663, Nanocomposite Copper-Ceria Catalysts for Low Temperature or Near-Ambient Temperature Catalysis and Methods for Making Such Catalysts, filed Sep. 28, 2004.

U.S. Appl. No. 11/252,849, Gold-Ceria Catalyst for Oxidation of Carbon Monoxide, filed Oct. 19, 2005.

U.S. Appl. No. 10/972,205, Formation and Depostion of Sputtered Nanoscale Particles in Cigarette Manufacture, filed Oct. 25, 2004.

U.S. Appl. No. 11/370,843, Method for Forming Activated Copper Oxide Catalysts, filed Mar. 9, 2006.

U.S. Appl. No. 11/371,021, Catalysts for Low Temperature Oxidation of Carbon Monoxide, filed Mar. 9, 2006.

U.S. Appl. No. 11/641,003, Corrugated Catalytic Cigarette Paper and Cigarettes Comprising the Same, filed Dec. 19, 2006.

U.S. Appl. No. 11/077,554, Methods for Forming Transition Metal Oxide Clusters and Smoking Articles Comprising Transition Metal Oxide Clusters, filed Mar. 11, 2005.

U.S. Appl. No. 10/560,396, Cigarette Wrapper With Printed Catalyst, filed Nov. 2, 2006.

* cited by examiner

US 7,560,410 B2

GOLD-CERIA CATALYST FOR OXIDATION OF CARBON MONOXIDE

RELATED APPLICATIONS

This application is a continuation application of U.S. patent application Ser. No. 11/252,849 entitled GOLD-CERIA CATALYST FOR OXIDATION OF CARBON MONOXIDE, filed Oct. 19, 2005 now abandoned which claims priority under 35 U.S.C. § 119 to U.S. Provisional Application No. 60/621,545 entitled GOLD-CERIA CATALYST FOR OXIDATION OF CARBON MONOXIDE and filed on Oct. 25, 2004, the entire content of each is hereby incorporated by reference.

SUMMARY

Provided is a catalyst comprising 0.1-3.0 weight % gold nanodots on cerium oxide. The catalyst is catalytically active for oxidation of carbon monoxide. Preferably, the catalyst is catalytically active for oxidation of carbon monoxide at room temperature.

Also provided is a method of preparing a catalyst catalytically active for oxidation of carbon monoxide comprising depositing 0.1-3.0 weight % gold nanodots on cerium oxide in solution to form the catalyst, aging the catalyst, filtering the catalyst, washing the catalyst, and drying the catalyst.

Further provided is a method of preparing a catalyst catalytically active for oxidation of carbon monoxide comprising depositing 0.1-3.0 weight % gold nanodots on cerium oxide in solution to form the catalyst subjecting the catalyst to ultrasound treatment, filtering the catalyst, washing the catalyst, and drying the catalyst.

Additionally provided is a method of preparing a catalyst catalytically active for oxidation of carbon monoxide at room temperature comprising depositing 0.1-3.0 weight % gold nanodots on cerium oxide in solution to form the catalyst, filtering the catalyst, washing the catalyst, and drying the catalyst. Such a catalyst further comprises a modifier.

The catalysts may be used in a variety of applications. For example, the catalyst may be incorporated into a vehicle exhaust emissions system in an amount effective to oxidize carbon monoxide to carbon dioxide. The catalyst may also be used for emissions reduction in the cold starting of an automobile engine in an amount effective to oxidize carbon monoxide to carbon dioxide. In another embodiment, the catalyst may be incorporated into a $CO_2$ laser in an amount effective to oxidize carbon monoxide to carbon dioxide. In another embodiment, the catalyst can be incorporated into a fuel cell in an amount effective to oxidize carbon monoxide to carbon dioxide. In yet another embodiment, the catalyst can be used in an air filter for the conversion of carbon monoxide and/or indoor volatile organic compounds.

The catalyst can be incorporated in tobacco cut filler, wrapper material or filter material of a cigarette, the catalyst being present in an amount effective to reduce the amount of carbon monoxide in tobacco smoke produced during smoking of the cigarette.

BRIEF DESCRIPTION OF THE DRAWINGS

FIG. 2a shows carbon monoxide conversion as a function of gold content and FIG. 2b shows concentration of carbon dioxide and carbon monoxide and conversion of carbon monoxide over 1% $Au/CeO_2$ as a function of temperature.

FIG. 8 is a plot of concentrations of carbon monoxide and carbon dioxide versus time over 1% $Au/CeO_2$ coated on a quartz tube after exposure to air for 60 days. Specifically.

FIG. 11 relates to the effect of exposure of the catalyst to moisture on carbon monoxide oxidation. Specifically, FIG. 11b shows the configuration used according to plot "1" in FIG. 11a, and FIG. 11c shows the configuration used according to plots "2", "3", and "4" in FIG. 11a.

DETAILED DESCRIPTION

Figure 1:
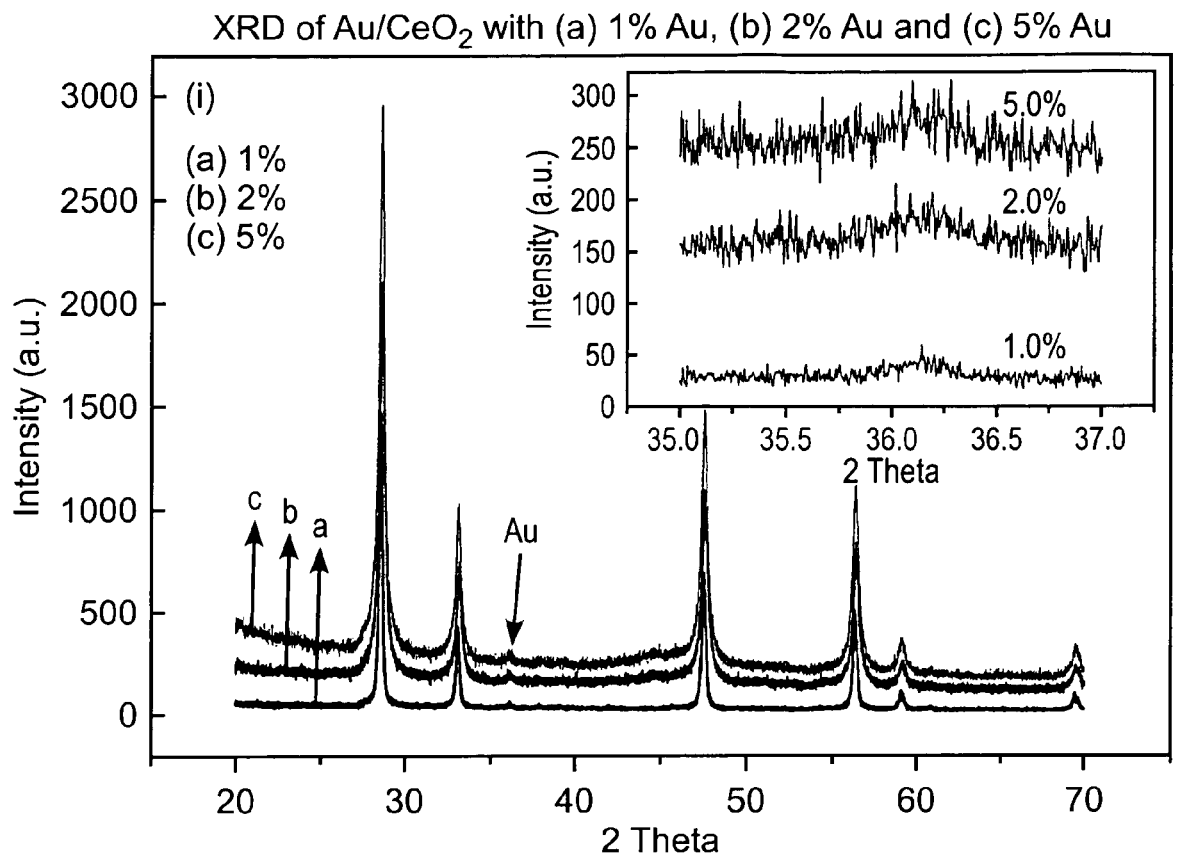
FIG. 1 shows x-ray diffraction (XRD) analysis of 1% $Au/CeO_2$, 2% $Au/CeO_2$, and 5% $Au/CeO_2$.

The oxidation of carbon monoxide over transition metal oxides follows a nucleophilic interfacial Mars-van Krevelen oxidation mechanism involving the transfer of oxygen from the lattice across the solid-gas interface, immediately followed by the filling of the lattice oxygen vacancy by the oxygen present in the reaction mixture. Gold on ceria, a reducible oxide, weakens ceria surface oxygen, thereby further enhancing its reducibility. More specifically, non-stoichiometric oxide species, possessing excellent ability to transport surface lattice oxygen, are formed. As a result, gold-ceria catalysts are very active for the oxidation of carbon monoxide.

Without wishing to be bound by theory, it is believed that the gold-ceria catalysts comprise gold clusters (nanodots) on the ceria, which provide surface sites for carbon monoxide adsorption. Charging of the cluster occurs by partial electron transfer from the support and the adsorbed carbon monoxide reacts with surface oxygen at the interface with ceria to form carbon dioxide and oxygen-vacancies (F-center) in the substrate that is immediately filled by the oxidant ($O_2$). Stated otherwise, the activity of gold-ceria for carbon monoxide oxidation can be attributed to the presence of highly dispersed gold clusters and to the availability of active gold sites in close contact with the surface defects on ceria.

The gold-ceria catalysts are prepared by deposition-precipitation technique as described below. Gold-ceria catalysts prepared by deposition-precipitation without a thermal aging or ultrasound treatment step have been found not to be very active at room temperature, as the aging or ultrasound treatment of the sample helps to disintegrate the catalyst particles making them nano-structured materials. "Nanodots," as used herein, refer to nanoscale particles. Further, washing impurities, such as chloride impurities in the technique described below, off the catalyst has been found to be effective in ensuring the room temperature activity of the catalyst, as the impurities cause agglomeration of gold particles and poison active sites.

When carbon monoxide is oxidized using the gold-ceria catalyst, a significant amount of carbon monoxide reduction can be achieved under certain test conditions. Preferably, greater than 25 weight % or greater than 50 weight % of carbon monoxide is oxidized, more preferably greater than 80 weight % of carbon monoxide is oxidized, even more preferably greater than 90 weight % of carbon monoxide is oxidized, and most preferably 100 weight % of carbon monoxide is oxidized using a gas stream of carbon monoxide in helium or argon.

It is contemplated that the gold-ceria catalyst may be incorporated into a cigarette (e.g., in the tobacco cut filler, wrapper and/or filter component) in an amount such that the amount of carbon monoxide in mainstream smoke is reduced during smoking of a cigarette. The term "mainstream" smoke refers to the mixture of gases and/or aerosol passing down the tobacco rod and issuing through the filter end, i.e., the amount of smoke issuing or drawn from the mouth end of a cigarette during smoking of the cigarette. The mainstream smoke contains smoke that is drawn in through both the lighted region, as well as through the cigarette paper wrapper. Preferably, the amount of catalyst will be a catalytically effective amount. Preferably, the catalyst will be incorporated in a cigarette in an amount effective to reduce carbon monoxide in mainstream smoke by at least 10%.

EXAMPLES

Gold-ceria catalysts containing 0.1 to 5 weight percent gold were prepared by deposition-precipitation technique as follows. Gold hydroxide was precipitated by the drop wise addition of a 0.1 M aqueous NaOH solution to a $1\times10^{-3}$ M solution of $HAuCl_4$ in 100 mL de-ionized water at a pH of 8.5. Appropriate quantity of cerium oxide support (Alfa Aesar, 5 μm) was suspended in 300 mL de-ionized water in a 1 L beaker and the pH of the suspension was brought to 8.5 using the NaOH solution. The gold hydroxide solution was then added to the ceria suspension under vigorous stirring at room temperature and the stirring continued for 2 hours at 60° C. (aging). Alternatively, the gold hydroxide solution added to the ceria suspension was subjected to ultrasound treatment for 1 hour in an ultrasonic bath (Fisher Scientific FS30H). The solution was then cooled to room temperature and filtered. The catalyst was washed several times with de-ionized water till free of chloride ions and dried overnight in an oven at 110° C. The pH of the solution was continuously monitored and kept at a constant value of 8.5 during the entire period prior to filtration. Another sample of 1% $Au/CeO_2$ was also prepared by the same procedure except that no aging of the catalyst was done.

While drying of the catalyst in air after thermal aging enhances the catalyst activity for the oxidation reaction, the activity of the catalyst is significantly lost on heating the catalyst beyond 200° C. in air or on reducing the catalyst in a flow of hydrogen at temperatures greater than 100° C. Further, the activity of supported gold catalyst is sensitive to moisture content.

The gold contents of the samples were determined by Inductively Coupled Argon Plasma-Atomic Emission Spectrometry (ICAP-AES). X-ray diffraction analyses of the catalysts were carried out using a Philips X'pert X-ray diffractometer, operated at 45 kV and 40 mA employing Cu $K_\alpha$ radiation. BET surface areas of the catalysts were determined by nitrogen adsorption at liquid nitrogen temperature using Micromeritics AutoChem II (Model 2920) unit. Carbon monoxide chemisorption studies on the catalysts were carried out at room temperature using a 7% CO-balance He mixture in the same instrument. Gold dispersion was estimated from carbon monoxide uptake by the catalyst, assuming a carbon monoxide to gold adsorption stoichiometry of one and an atomic gold cross sectional area of 0.08696 $nm^2$. Temperature programmed reduction (TPR) studies on the catalyst samples were studied using a 7% $H_2$-balance Ar mixture in the same Micromeritics instrument. XPS analyses of the samples were conducted using an X-ray Photoelectron Spectrometer (Physical Electronics 5700LSci) using an Al $K\alpha$ X-ray source with a pass energy of 50 eV.

For the carbon monoxide oxidation tests, approximately 50 mg of the oven heated catalyst sample was loaded between two glass wool beds in a horizontal quartz tube reactor (8 mm i.d., 60 cm long) placed inside a programmable tube furnace (Thermolyne, Model 48000). Carbon monoxide oxidation was studied by passing a 3.6% CO-21% $O_2$-balance Ar mixture over the catalyst at a flow rate of 1 L/minute through the catalyst bed. A thermocouple in the middle of the furnace and a second thermocouple inside the reactor in contact with the catalyst bed measured the temperatures of the heating zone of the furnace and the catalyst bed, respectively. A temperature rise was observed in the catalyst bed as soon as the gas mixture was passed through the bed, due to the exothermic nature of the oxidation reaction. The temperature rise was controlled by external cooling of the reactor bed using a strong flow of air over the reactor surface, which kept the temperature of the catalyst bed below 30° C. Analysis of the gas mixture exiting the catalyst bed was carried out using a NLT2000 multi-gas analyzer from Rosemount Analytical, Orville, Ohio capable of measuring concentrations of carbon monoxide, carbon dioxide and oxygen.

Elemental analysis by ICAP shows that the actual gold content in the prepared catalysts is approximately the same as the calculated amount, indicating no loss of gold during catalyst formation and washing. XRD analysis of the catalysts (FIG. 1) shows peaks corresponding to a fluorite structure of ceria, while no gold peaks are detected in samples with gold content of up to 2 weight %. Very small gold peaks may be detected in samples with gold content of 3 or 5 weight %. XRD analysis can only identify compounds or substances with particle sizes greater than 5-10 angstroms. Accordingly, lack of detectable gold peaks for the samples with gold content of up to 2 weight % and very small gold peaks for the samples with gold content of 3 and 5 weight % indicates that the gold nanodots are well dispersed.

Adsorption properties of gold-ceria catalysts are presented in Table 1. Carbon monoxide chemisorption studies provide gold area and dispersion results. Carbon monoxide chemisorption studies are based on the concept that each carbon monoxide molecule is adsorbed on each gold particle, regardless of the size of the gold particle. Therefore, the number of carbon monoxide particles adsorbed can provide the value of the number of gold particles present on the catalyst surface. The number of gold particles present on the catalyst surface divided by the theoretical number of gold particles for a given weight percentage of gold gives the percent dispersion of gold on the catalyst surface.

TABLE 1

Adsorption data of Au/CeO$_2$ catalysts

| Gold content (weight %) | BET area (m$^2$/g$_{catalyst}$) | Gold area (m$^2$/g$_{Au}$) | Gold dispersion (%) |
|---|---|---|---|
| 0.0 | 32 | — | — |
| 0.1 | 32 | 58 | 22 |
| 0.5 | 38 | 85 | 32 |
| 1.0 | 36 | 61 | 23 |
| 2.0 | 36 | 56 | 21 |
| 3.0 | 25 | 15 | 6 |
| 5.0 | 25 | 9 | 3 |

Figure 2A:
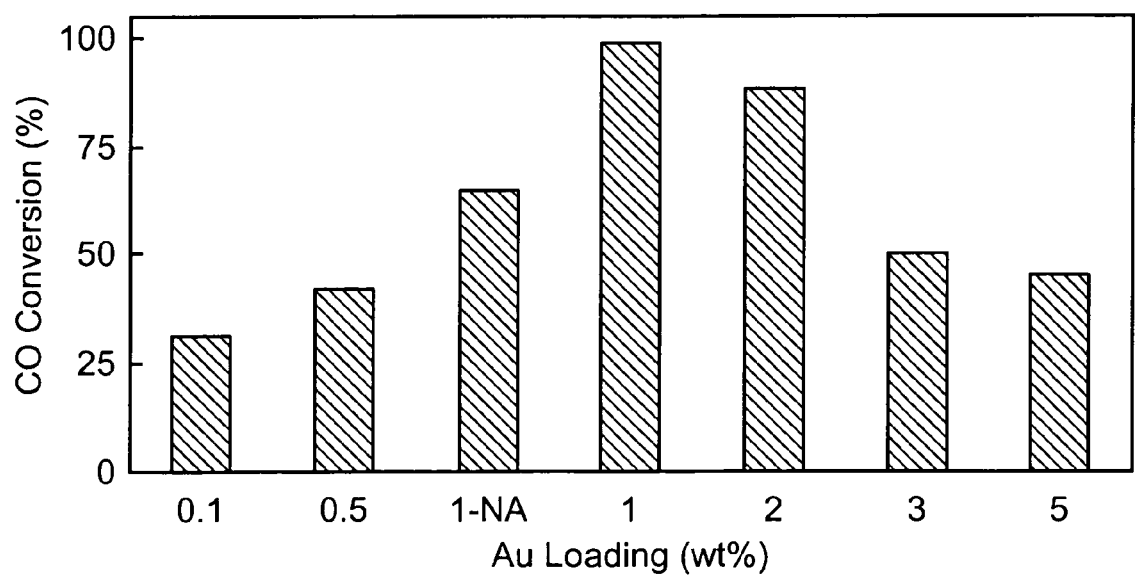
FIGS. 2a and 2b show results from the oxidation of carbon monoxide over $Au/CeO_2$ catalysts at room temperature. Specifically.
Figure 2B:
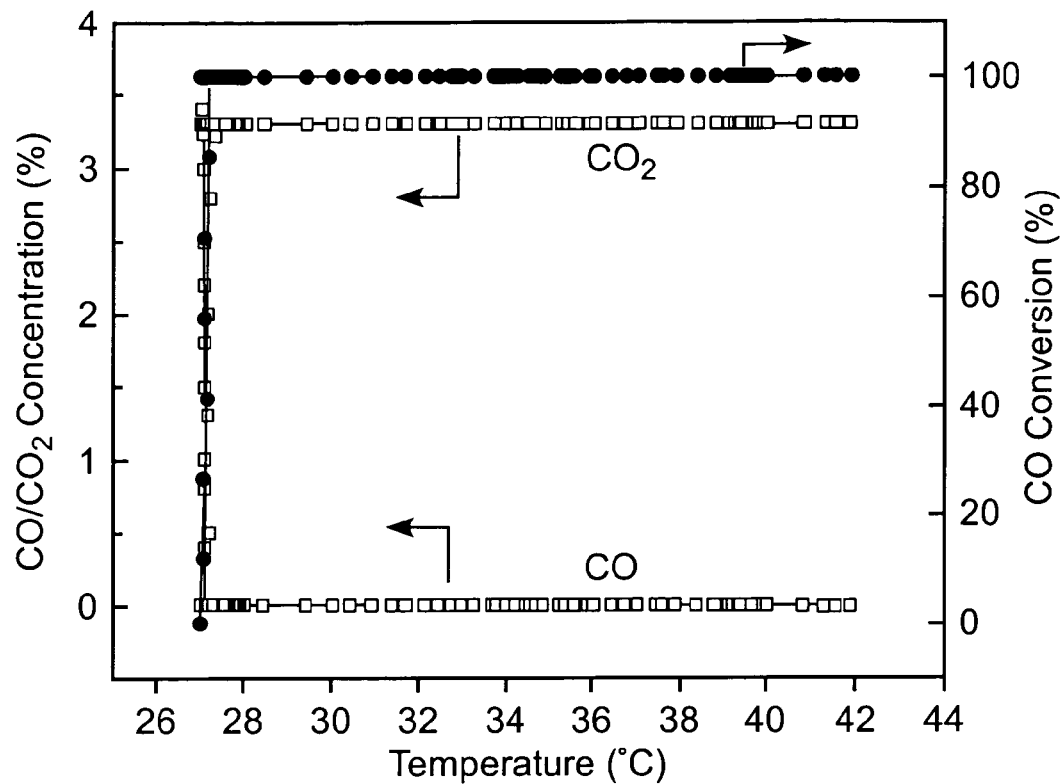

Results from the oxidation of carbon monoxide over Au/CeO$_2$ catalysts at room temperature are shown in FIGS. 2a and 2b, experimental conditions for which included a flow rate of 3.6% CO-21% O$_2$-balance Ar of 1.0 L/min, 50 mg of catalyst, and space velocity of about 10,000 h$^{-1}$, in terms of carbon monoxide flow, or 120,000 h$^{-1}$, in terms of total gas flow. The 1% Au/CeO$_2$ catalyst afforded a complete oxidation of carbon monoxide to carbon dioxide at room temperature. The 1% Au/CeO$_2$ catalyst prepared without aging (1-NA) is not as active as the aged catalyst, implying that the crystallite size of the support affects activity of the catalyst, as aging helps to form a well dispersed nano-crystalline phase. The estimated specific activity for the 1% Au/CeO$_2$ catalyst is about 490×10$^{-4}$ mol$_{CO}$/s/g$_{Au}$ at 30° C.

A correlation of the adsorption properties of the catalysts (Table 1) with carbon monoxide conversion reveals that the catalyst with highest activity is not the one that has the highest gold area or dispersion, suggesting that the active site for the oxidation may not be a single gold site, but rather multiple gold sites. The presence of very highly dispersed gold clusters of about 1 nm has been observed on the surface of Au/CeO$_2$ prepared by deposition-precipitation by High Resolution Transmission Electron Microscopy and Energy Dispersive Spectroscopy.

Figure 3:
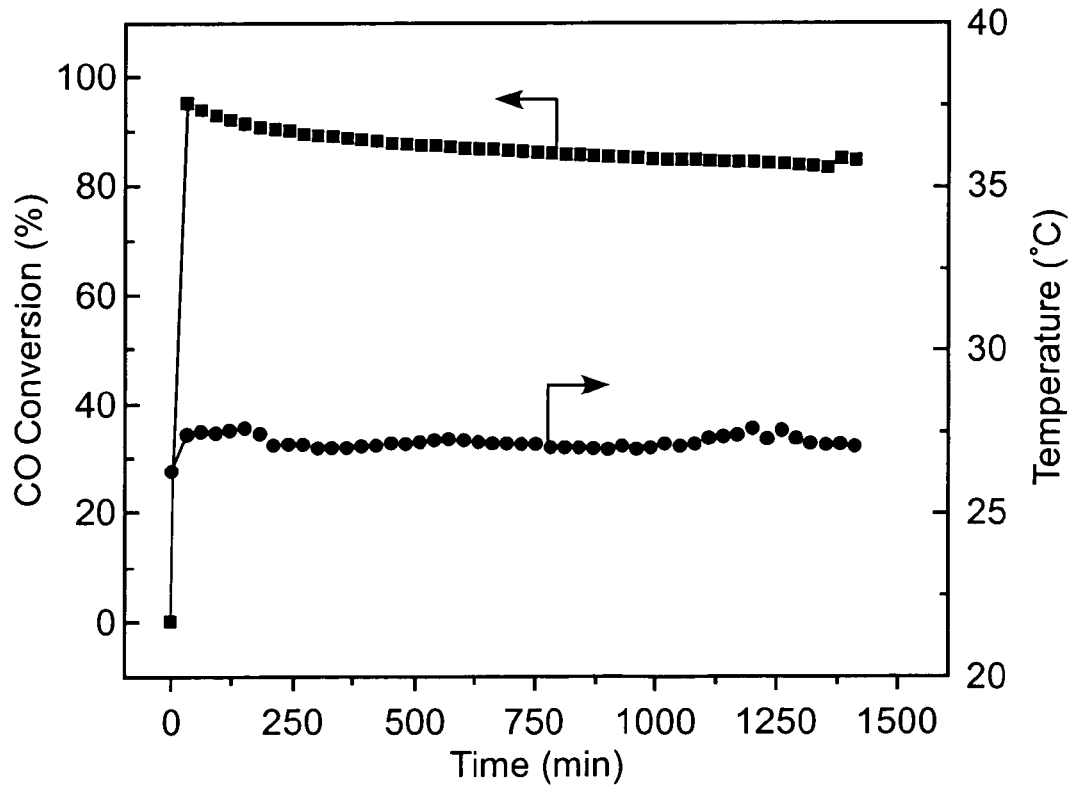
FIG. 3 show a time-on-stream study of carbon monoxide oxidation over 1% $Au/CeO_2$ conducted to investigate catalyst deactivation.

Time-on-stream studies (FIG. 3), experimental conditions for which were the same as for FIGS. 2a and 2b, were conducted to investigate catalyst deactivation. The catalyst was formed by deposition-precipitation as described herein, followed by ultrasound treatment and aging. The time-on-stream studies reveal no significant decline in the oxidation activity during a 24 hour reaction period in spite of the high space velocity used. Specifically, carbon monoxide conversion was initially almost 100% and after 24 hours (1440 minutes) the carbon monoxide conversion was about 86%, thereby giving only about a 14% reduction in oxidation activity.

Figure 4:
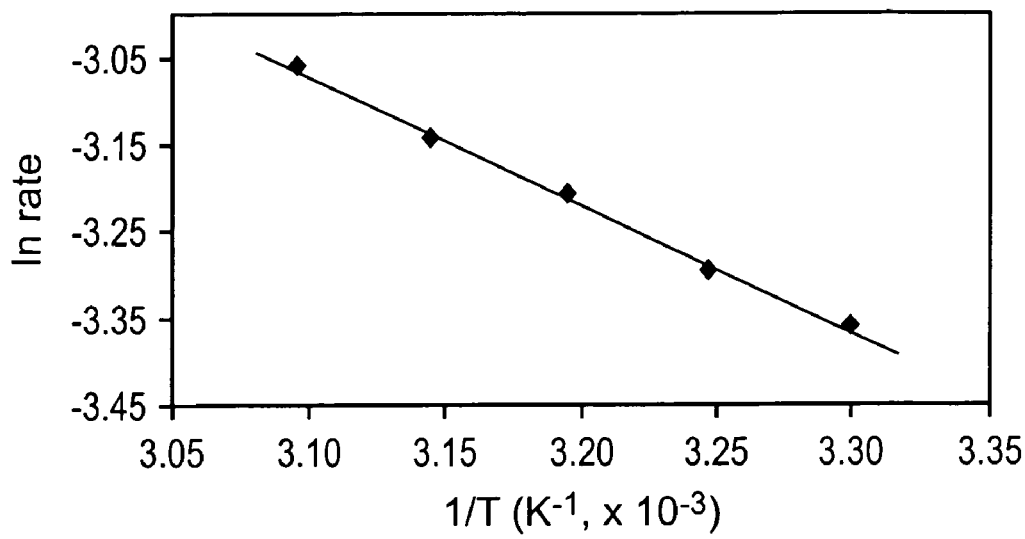
FIG. 4 is a plot of the log reaction rate versus the inverse of temperature of carbon monoxide oxidation over 1% $Au/CeO_2$.

The reaction shows zero order kinetics with respect to the concentration of carbon monoxide in the range of 0.5 to 3.6% under the conditions studied and a plot of the log reaction rate versus the inverse of temperature (FIG. 4) gives an estimated activation energy of 12.2 kJ/mol in the temperature range of 30-50° C. Control studies show no activity for the support or gold tested alone at room temperature.

Figure 5:
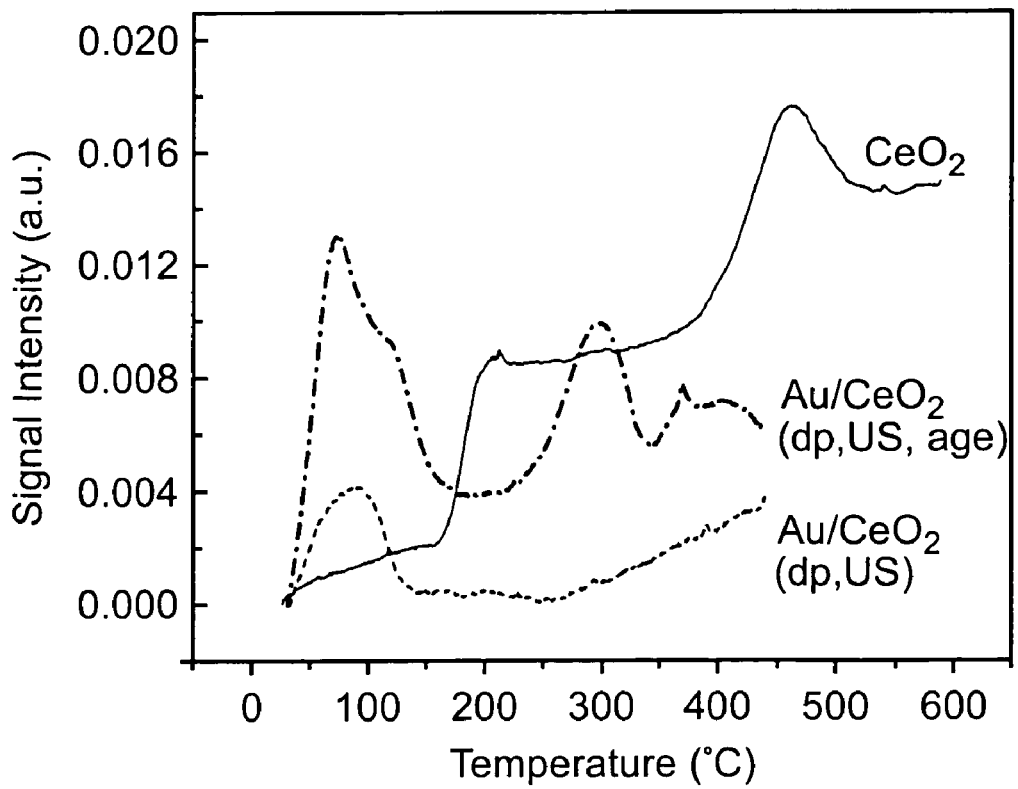
FIG. 5 shows TPR profiles of $CeO_2$ and 1% $Au/CeO_2$.

As illustrated in FIG. 5, TPR profiles show significant lowering of the reduction temperature of 1% Au/CeO$_2$ (formed by deposition-precipitation as described herein, followed by ultrasound treatment and aging and by ultrasound treatment alone) as compared to CeO$_2$. From the TPR profiles, hydrogen consumption, calculated from the area of a peak, for temperatures less than 250° C. was estimated to be about 94 μmol/g and about 322 μmol/g for ceria and gold-ceria, respectively, implying that the presence of gold helps to weaken ceria surface oxygen, which enhances the reducibility of the catalyst and facilitates the oxygen transfer across the solid-gas interface. Stated otherwise, the higher hydrogen consumption for gold-ceria as compared to ceria indicates a greater reducing capacity for gold-ceria as compared to ceria.

Figure 6:
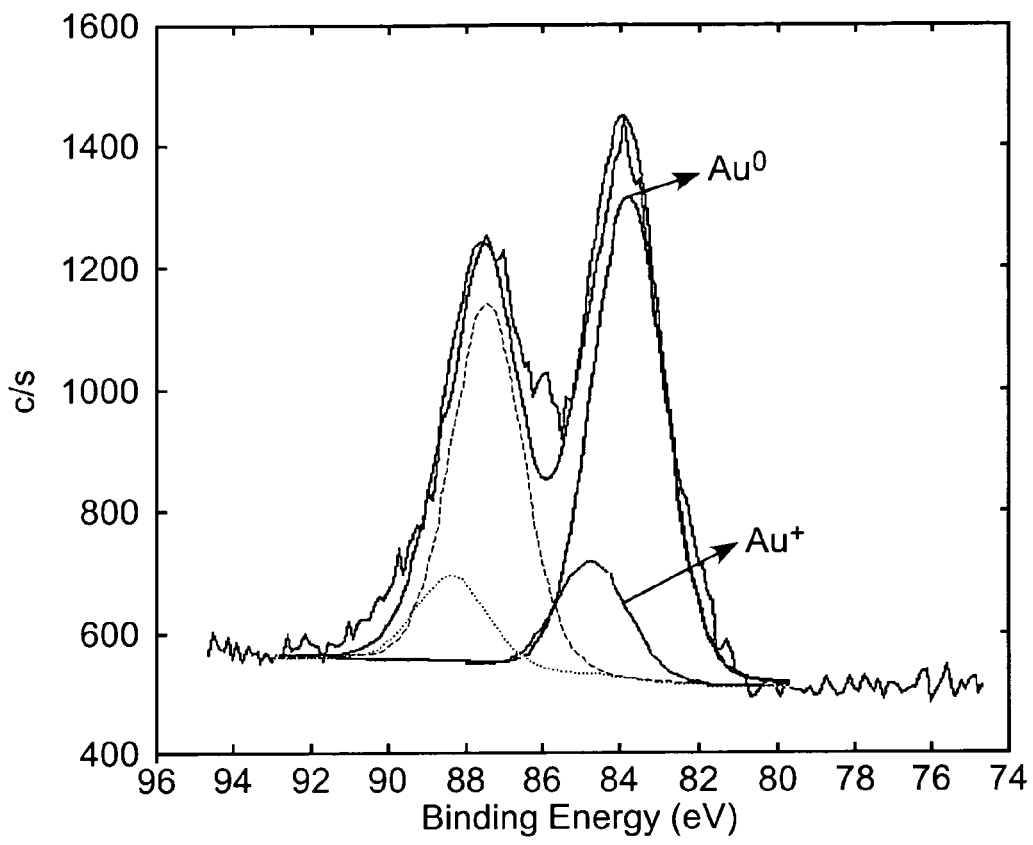
FIG. 6 shows an x-ray photoelectron spectroscopy (XPS) spectra of Au $4f_{5/2}$ in 1% Au $CeO_2$.

XPS spectra of Au4f peaks (FIG. 6) show a doublet at 83.6 eV and 87.6 eV corresponding to Au4f$_{7/2}$ and Au4f$_{5/2}$, respectively, suggesting that gold is mainly present in Au$^0$ state. However, the full width at half maximum (FWHM) of the peaks is greater than 2.0 eV, connoting the co-existence of other oxidation states of gold. Curve fitting of the Au4f peak shows a second peak at 84.7 eV (Au4f$_{7/2}$), which could be due to the presence of Au$^+$. However, there is no indication of the presence of other Au species, such as Au$_2$O$_3$ (86.3 eV) or Au(OH)$_3$ (87.7 eV). The Au$^+$ species may be an ionic species, such as Au$^+$—OH$^-$. These results suggest that the active site for carbon monoxide oxidation may be a combination of Au$^+$—OH$^-$ and metallic gold in which Au$^0$ is responsible for the activation of O$_2$ molecule and the hydroxyl containing Au cation provides the pathway for the conversion of carbon monoxide to carbon dioxide. Neither Au$^0$ nor Au$^+$ is active if present alone. This also explains the enhancement of the activity of the catalyst after exposure to the atmosphere after drying at 110° C., as described above.

Accordingly, preferred catalysts comprise 0.1-3.0 weight % gold nanodots on cerium oxide, more preferably 0.1-2.0 weight % gold, even more preferably 0.5-1.5 weight % gold, and even more preferably 0.5-1.0 weight % gold.

Additional catalysts were prepared by similar procedures, as follows:

TABLE 2

Au/CeO$_2$ catalysts

| | | Deposition-Precipitation Conditions | | |
|---|---|---|---|---|
| Catalyst | pH | Aged at 60° C. for 2 hour | Subjected to Ultrasound for 1 hour | Dried at 110° C. for 14 hours |
| 1% Au/CeO$_2$ | 8.0-8.5 | ✓ | | ✓ |
| 1% Au/CeO$_2$ | 8.0-8.5 | | ✓ | ✓ |
| 1% Au/5% Fe/ 95% CeO$_2$ | 8.0-8.5 | | | ✓ |
| 1% Au/50% CeO$_2$/ 50% TiO$_2$ | 8.0-8.5 | | | ✓ |
| 1% Au/90% CeO$_2$/ 10% ZrO$_2$ | 8.0-8.5 | | | ✓ |
| 1% Au/90% CeO$_2$/ 10% ZnO | 8.0-8.5 | | | ✓ |
| 1% Au/1% Pd/ 80% CeO$_2$/ 20% ZrO$_2$ | 8.0-8.5 | | | ✓ |

Room temperature active catalysts can be prepared without a thermal aging or ultrasound treatment step by including in the catalyst composition a modifier such as a second oxide, preferably present in an amount of 5.0-60.0 weight %, suitable examples of which include, for example, TiO$_2$, ZrO$_2$ and ZnO, or a second metal, preferably present in an amount of 0.1-10.0 weight %, suitable examples of which include, for example, Fe and Pd. In preparing catalysts including a modifier, a second oxide would be included with the cerium oxide support, while a second metal precursor, such as PdCl$_2$ would be included in the solution containing HAuCl$_4$ to form palladium hydroxide in addition to gold hydroxide.

Figure 7:
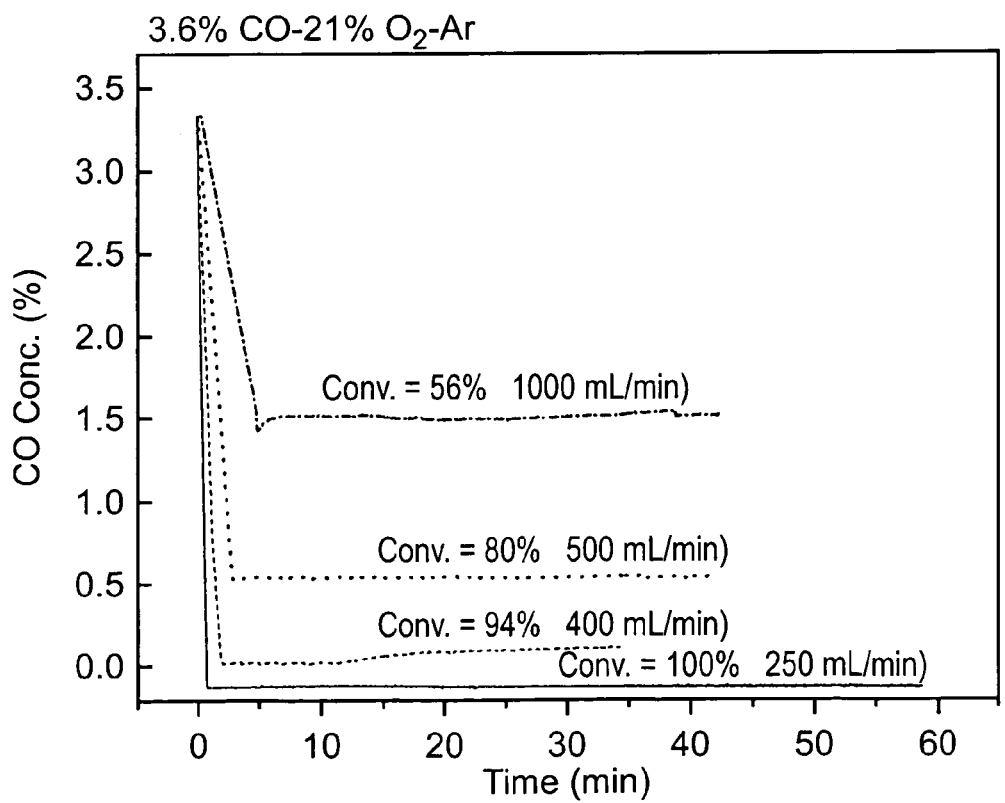
FIG. 7 is a plot of carbon monoxide concentration versus time in a 3.6% CO-21% $O_2$-balance Ar stream passed over 1% $Au/CeO_2$ coated on a quartz tube.

FIG. 7 is a plot of carbon monoxide concentration versus time in a 3.6% CO-21% O$_2$-balance Ar stream passed over 4 g of 1% Au/CeO$_2$ coated on a 4.5 cm×57 cm quartz tube with a surface area of 838 cm$^2$ and a volume of 907 cm$^3$ at room temperature. Total gas flow rates of 0.25, 0.4, 0.5, and 1 L/min yielded carbon monoxide conversions (determined by carbon monoxide concentration) of 100%, 94%, 80%, and 56%, respectively.

Figure 8A:
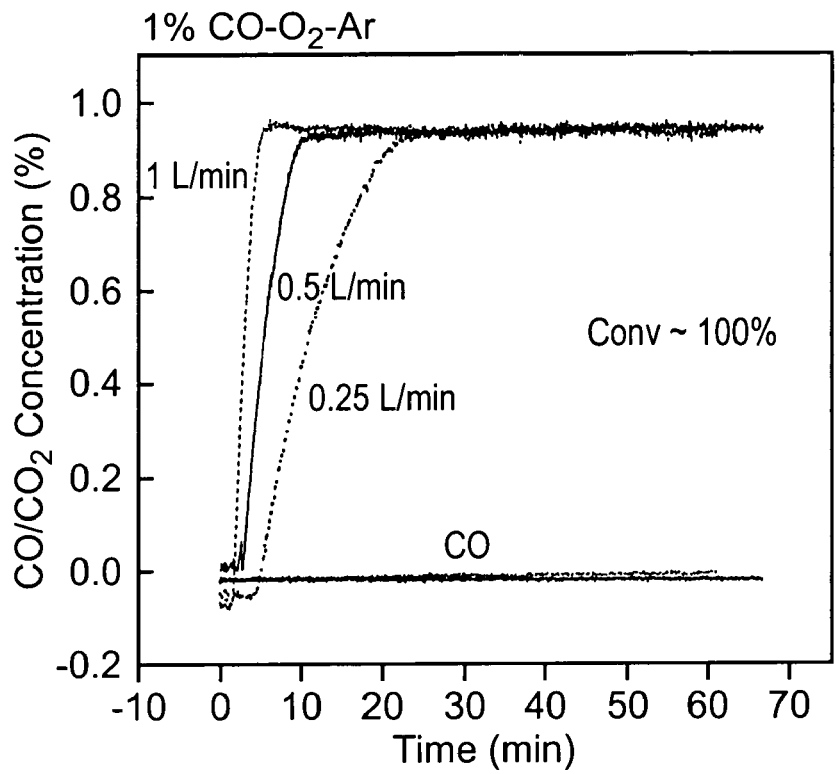
FIG. 8a shows concentration of carbon monoxide and carbon dioxide in a 1% CO-21% $O_2$-balance Ar stream and FIG. 8b shows concentration of carbon monoxide and carbon dioxide in a 3.6% CO-21% $O_2$-balance Ar stream.
Figure 8B:
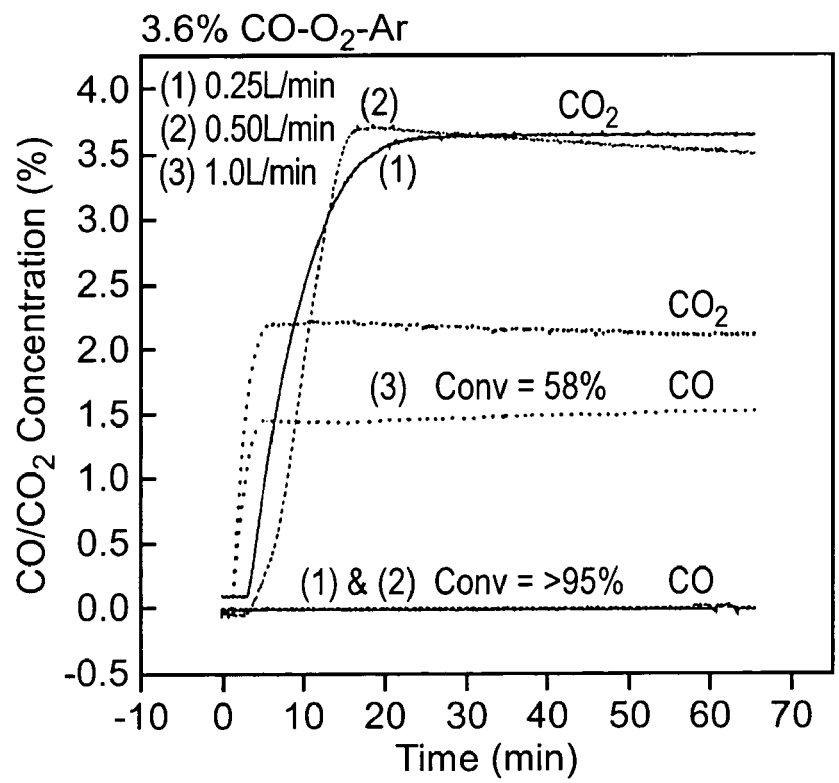

FIG. 8 is a plot of concentrations of carbon monoxide and carbon dioxide versus time over 4 g of 1% $Au/CeO_2$ coated on a 4.5 cm×57 cm quartz tube with a surface area of 838 $cm^2$ and a volume of 907 $cm^3$ at room temperature. The $Au/CeO_2$ was exposed to air for 60 days before testing in a 1% CO-21% $O_2$-balance Ar stream (FIG. 8a) and a 3.6% CO-21% $O_2$-balance Ar stream (FIG. 8b). Total gas flow rates of 0.25, 0.5, and 1 L/min all yielded carbon monoxide conversions (determined by carbon monoxide concentration) of approximately 100% for 1% CO-21% $O_2$-balance Ar, while for 3.6% CO-21% $O_2$-balance Ar, total gas flow rates of 0.25 and 0.5 L/min both yielded carbon monoxide conversions of greater than 95% and a total gas flow rate of 1 L/min yielded a carbon monoxide conversion of 58%.

As $Au/CeO_2$ coated on a quartz tube showed good carbon monoxide oxidation activity at room temperature, it is believed that $Au/CeO_2$ could suitably be used in air filter and air purification applications. Furthermore, $Au/CeO_2$ maintained its high activity even after exposure to air for 60 days.

Figure 9:
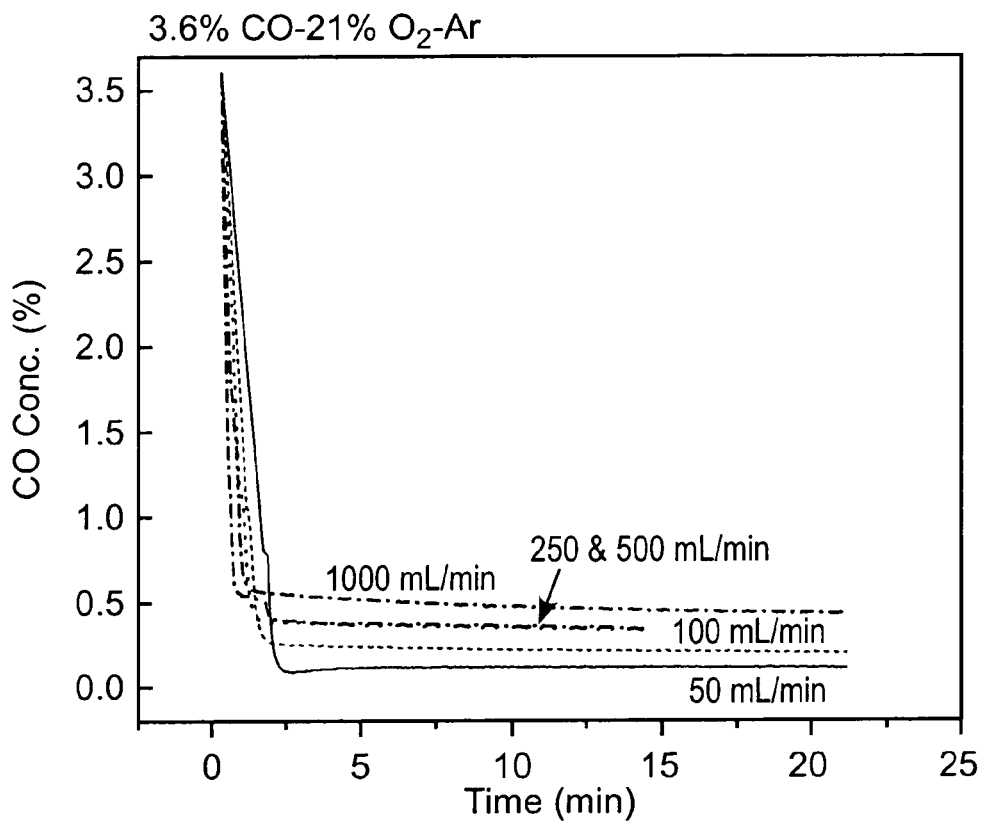
FIGS. 9 and 10 are plots of carbon monoxide concentrations versus time in a 3.6% CO-21% $O_2$-balance Ar stream passed over 1% $Au/CeO_2$ coated on a Cambridge Pad.

FIG. 9 is a plot of carbon monoxide concentration versus time in a 3.6% CO-21% $O_2$-balance Ar stream passed over 0.250 g of 1% $Au/CeO_2$ coated on a Cambridge Pad at room temperature at total gas flow rates of 0.05, 0.1, 0.25, 0.5, and 1 L/min. The $Au/CeO_2$ was dried on a Cambridge Pad at 110° C. for 14 hours prior to testing. A Cambridge Pad is a pad often used to collect particulate matter delivered by a cigarette.

Figure 10:
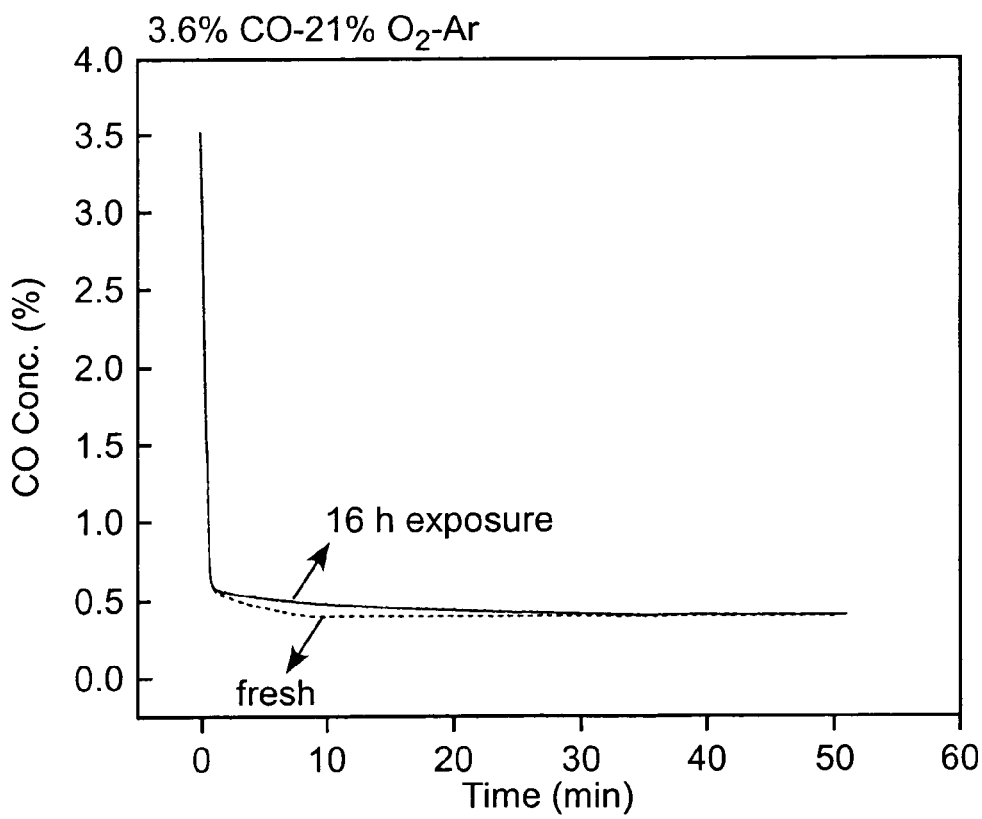

FIG. 10 is a plot of carbon monoxide concentration versus time in a 3.6% CO-21% $O_2$-balance Ar stream passed over 0.250 g of 1% $Au/CeO_2$ coated on a Cambridge Pad at room temperature at a total gas flow rate of 0.5 L/min. The $Au/CeO_2$ was dried on a Cambridge Pad at 110° C. for 14 hours ("fresh") and dried at 110° C. for 14 hours followed by exposure to air for 16 hours prior to testing.

Figure 11A:
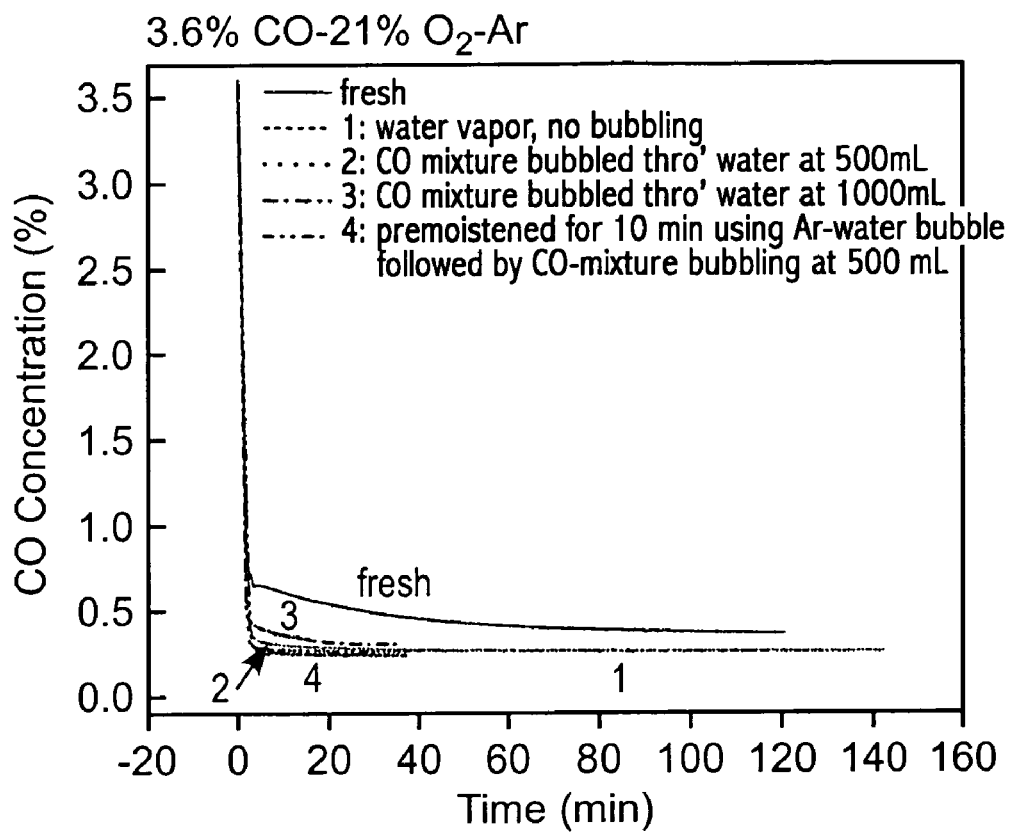
FIG. 11a is a plot of carbon monoxide concentration versus time in a 3.6% CO-21% $O_2$-balance Ar stream passed over 1% $Au/CeO_2$ coated on a Cambridge Pad.
Figures 11B, 11C:
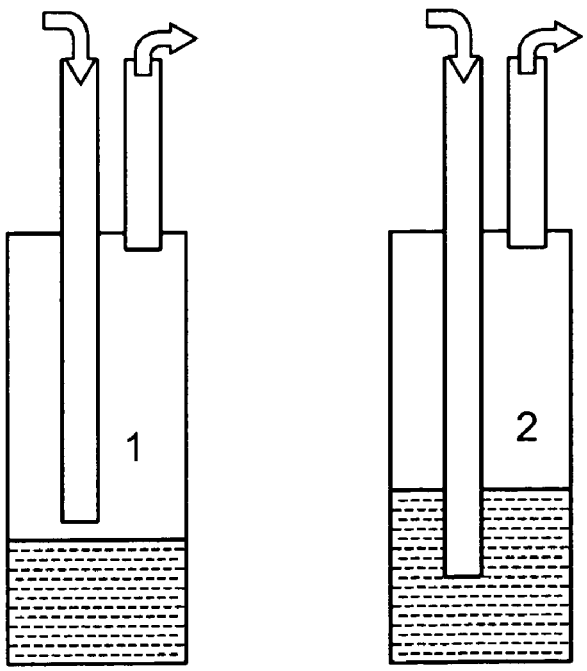

FIG. 11, related to the effect of exposure of the catalyst to moisture on carbon monoxide oxidation, shows that the catalyst should sustain its activity even in a humid atmosphere. FIG. 11a is a plot of carbon monoxide concentration versus time in a 3.6% CO-21% $O_2$-balance Ar stream ("CO mixture") passed over 0.250 g of 1% $Au/CeO_2$ coated on a Cambridge Pad at room temperature. The $Au/CeO_2$ was dried on a Cambridge Pad at 110° C. for 14 hours prior to testing ("fresh"). The total gas flow rate for testing of the fresh catalyst was 0.5 L/min. Additional test parameters included exposing the CO mixture at a total gas flow rate of 0.5 L/min to water before exposure to the catalyst ("1"; FIG. 11b), bubbling the CO mixture at a total gas flow rate of 0.5 L/min through water before exposure to the catalyst ("2"; FIG. 11c), bubbling the CO mixture at a total gas flow rate of 1 L/min through water before exposure to the catalyst ("3"; FIG. 11c), and exposing the catalyst to argon gas bubbled through water at a flow rate of 0.5 L/min for 10 minutes to expose the catalyst to moisture prior to bubbling the CO mixture at a total gas flow rate of 0.5 L/min through water before exposure to the catalyst ("4"; FIG. 11c).

While various embodiments have been described, it is to be understood that variations and modifications may be resorted to as will be apparent to those skilled in the art. Such variations and modifications are to be considered within the purview and scope of the claims appended hereto.

What is claimed is:

1. A catalyst comprising 0.1-3.0 weight % gold nanodots on cerium oxide, wherein the catalyst is catalytically active for oxidation of carbon monoxide, and wherein the catalyst further comprises 10.0-60.0 weight % of a second oxide zinc oxide.

2. The catalyst of claim 1, wherein the catalyst is catalytically active for oxidation of carbon monoxide at room temperature.

3. The catalyst of claim 1, further comprising 0.1-10.0 weight % of another metal selected from the group consisting of iron and palladium.

4. The catalyst of claim 1, wherein the catalyst comprises 0.5-1.5 weight % gold.

5. A method of oxidizing carbon monoxide comprising exposing carbon monoxide to the catalyst of claim 1.

6. The method of claim 5, wherein the carbon monoxide is exposed to the catalyst at room temperature.

7. A cigarette comprising the catalyst of claim 1.

8. An air filter comprising the catalyst of claim 1.

* * * * *